Nov. 19, 1968 J. O. KELLEY 3,411,730

REVERSING SOUND TAPE REEL

Filed Aug. 16, 1966 2 Sheets-Sheet 1

INVENTOR.

Jerry O. Kelley

BY

[signature]

ATTORNEY.

REVERSING SOUND TAPE REEL
Filed Aug. 16, 1966 2 Sheets-Sheet 2
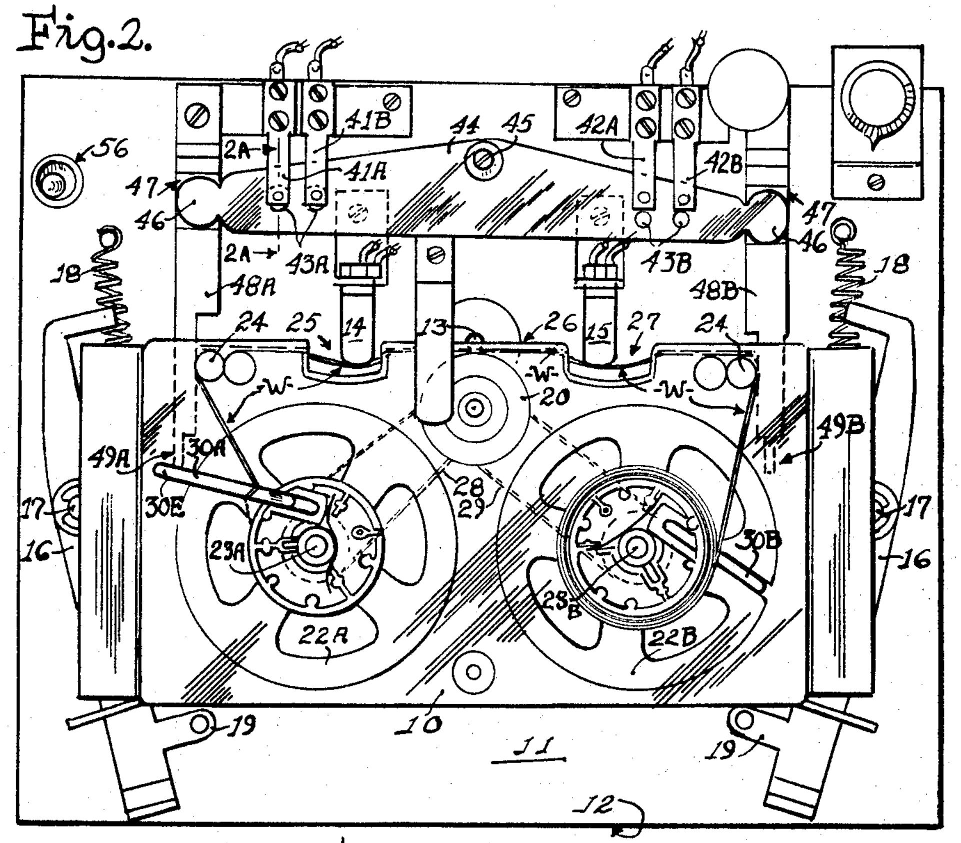
Fig.2.
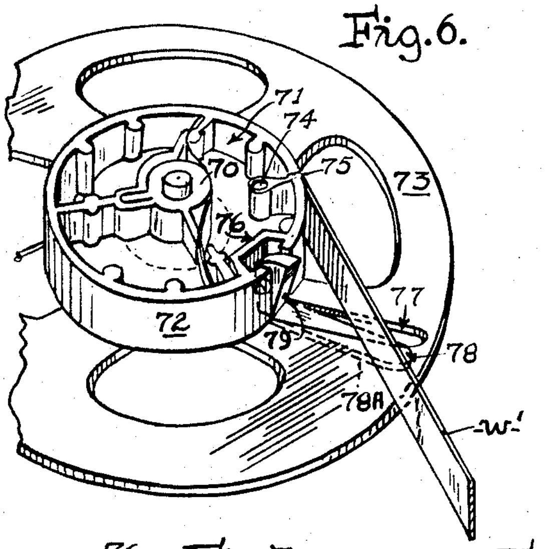
Fig.6.
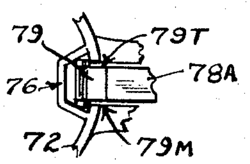
Fig.10.
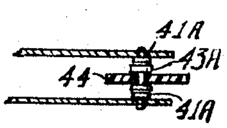
Fig.2-A
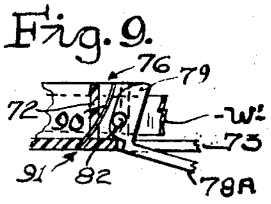
Fig.9.
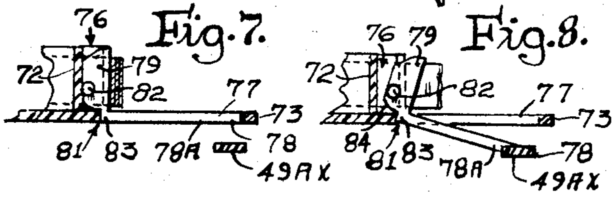
Fig.7. Fig.8.
INVENTOR.
Jerry O. Kelley
BY
[signature]
ATTORNEY.

United States Patent Office 3,411,730
Patented Nov. 19, 1968

3,411,730
REVERSING SOUND TAPE REEL
Jerry O. Kelley, Chicago, Ill., assignor to Cart-Trac, Inc., Chicago, Ill., a corporation of Illinois
Filed Aug. 16, 1966, Ser. No. 572,741
9 Claims. (Cl. 242—55.13)

ABSTRACT OF THE DISCLOSURE

In sound tape reels and the like, a control finger slides linearly in a flange portion of the reel in a direction which may be approximately radial or chordal with respect to the reel hub, the finger having an inner end which fits into a recess in the hub in a manner such that the terminal portions of the tape can be wound onto and from the hub, a terminal portion of the tape fitting into a slot in such inner end so disposed that the unwinding or rewinding pull on the tape will positively drive and shift the finger linearly in and out, depending upon which way the tape is being wound, the outer end of the finger projecting on outward displacement thereof to engage and actuate a switch-control member, or the like.

This invention relates to sound tape apparatus and more particularly to improved and simplified means for automatically reversing a capstan or reel-driving motor and the direction of rotation of a pair of tape reels driven thereby and feeding the tape from one to another reversely, in conjunction with a cartridge.

The majority of arrangements for reversing the tape travel in transducing and recording mechanisms involve the use of relays controlled by either switches actuated by tension on the payout tape as it reaches the end of its wound length on the reel, or by signals produced by metallic tags or protuberances affixed to the tape close to the respective ends thereof and adapted to close a physical circuit or operate a switch for the same purpose. The cost of relay components and the assembly and wiring thereof is considerable.

According to the present improvements, a simple switch means dispenses with the expense of relays as well as all forms of tagging and attachments to the tape itself, reliable reversing control being achieved by a simple trigger means forming part of each reel and operated by the tape as it nears the end of its length or payout run.

More detailed aspects of novelty and utility and the various advantages and economies inherent in the novel reversing system will appear more fully as the following description proceeds in view of the annexed drawings in which:

FIGURE 2 is a top plan view of the deck of a transducing unit with a reel-to-reel cartridge in operative position thereon;

Figure 3:
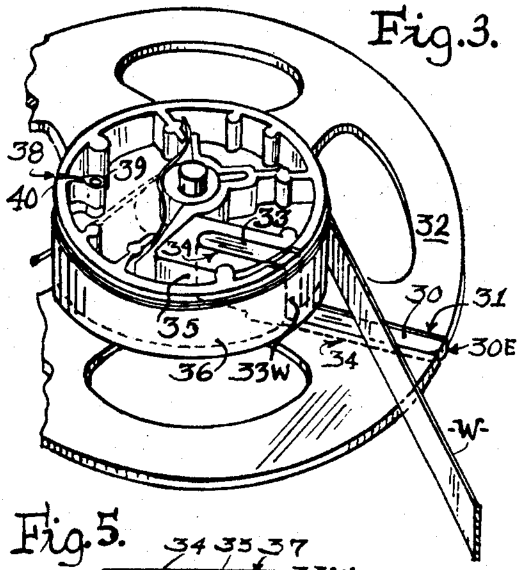
Figure 4:
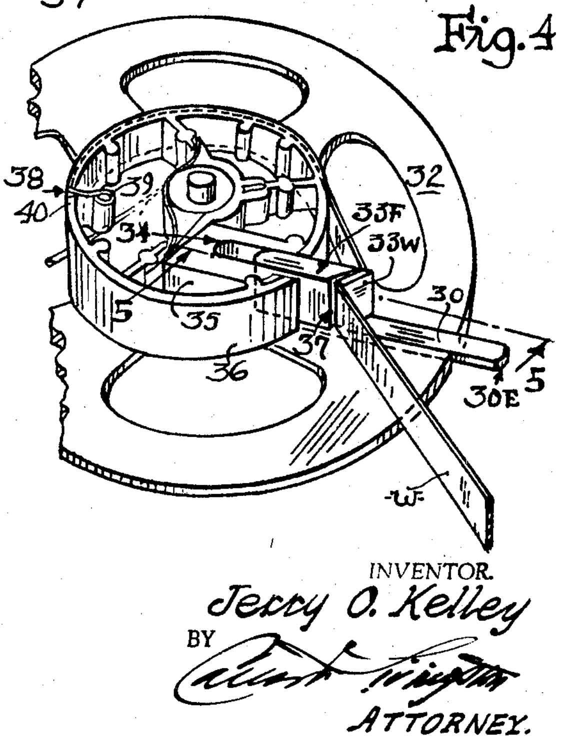
Figure 5:
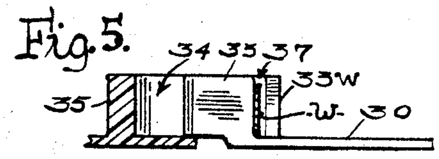

FIGURE 2–A is a sectional fragment of parts of the control switch means taken along lines 2A—2A of FIGURE 2;

FIGURES 3 and 4 are fragmentary perspective views to enlarged scale of a tape reel and automatic reversing means forming a part thereof and respectively shown in different operating positions;

FIGURE 5 is a fragmentary sectional detail through the hub portion of one of the reels as seen along lines 5—5 of FIGURE 4;

FIGURE 6 is a fragmentary perspective view of a modified form of tape reel;

FIGURES 7 and 8 are fragmentary sectional details of the trigger mechanism in the form of reel shown in FIGURE 6, respectively shown in changed operating conditions;

FIGURE 9 is a view similiar to FIGURE 8 showing a modification over the latter;

FIGURE 10 is a fragmental detail looking down in plan upon the view of FIGURE 8.

The novel tape-controlled reversing means is equally applicable to the open or deck-mounted reel, and reels enclosed within a cartridge, and has advantages particularly useful for cartridge operation such as illustrated in FIGURE 2, wherein a reel-to-reel cartridge 10 is depicted in operative position upon the deck 11 of a transducing unit 12 having a reversely driving capstan spindle 13 projecting up above the deck level at a position between two sound heads 14 and 15.

The cartridge 10 is secured in operative position on the deck by locking levers 16 pivoting at 17 and urged by over-center spring means 18 to press their offset portions 19 against the cartridge in a direction to urge the same toward the capstan spindle in order to press the pinch roller 20 and the tape web W against said spindle 13, the pinch roller being contained within the cartridge with peripheral portions exposed through window 26 for engagement with the capstan as aforesaid.

Two tape reels 22A and 22B of identical construction are contained within the cartridge each rotatable about its own spindle 23A, 23B forming a part of the cartridge, the web of the tape being trained over guide formations 24 also forming part of the cartridge and running past window openings 25, 26 and 27 which expose it to the two sound heads 14 and 15 and the capstan spindle 13 and the driving action of the pinch roller 20.

The cartridge illustrated is of the type disclosed in a copending application Ser. No. 354,477 now Patent No. 3,348,786 having as one of its special features a reverse reel-driving means including a novel pulley-drive and clutch means (not seen) forming part of the pinch roller 20 and disposed on the underside of the latter. Pulley belts 28 and 29 reversely driven by the aforesaid clutch drive means respectively rotate the reels 22A and 22B in their reverse operations as payout and take-up reels, in the manner and with the several advantages set out in said application, one of the purposes of such a reel-driving means being to effect a more uniform travel of the tape with respect to the sound heads and to protect the tape against undue stresses and breakage in its reverse reeling travel. For present purposes, it is sufficient to observe that the direction of travel of the tape, and hence the directions of rotation of the two reels, will depend upon the direction of rotation of the capstan spindle 13 and its pulling effort on the tape pressed against it by the pinch roller 20, the motor which drives the spindle being reversible, and it being the principal object of the disclosed reel-reversing means to control the direction of rotation of the drive motor as a function of the approach of the unwinding tape web toward the end of its length, as will more fully appear.

Referring to the enlarged views of the reels shown in FIGURES 3 and 4, the reversing means includes a trigger lever 30 in the form of an elongated finger sufficiently flat in its forward parts to slide in a groove 31 formed in the bottom flange 32 of the reel and extending back into the hub portion of such reel along a line which is non-radial but parallel to the reel radius.

The inner end region of the trigger lever terminates in an enlarged upstanding block portion 33 (FIGURE 4) which slides into a groove 34 in a stationary block member 35 formed as an integral part of the hub part of each reel, the groove 34 in the reel block opening outwardly through the annular wall 36 which forms the core of the reel onto which the tape is wound.

As seen in FIGURE 4, the trigger is slidable from the normal, inward position shown in FIGURE 3, to an outward trigger position wherein a forward portion 33F of the finger block 33 has moved a considerable distance beyond the annular spool wall 36, and the outer end 30E of the finger has moved a like distance beyond the rim of the reel where it will engage another reversing control member in a manner to be explained.

The finger block 33, as seen in FIGURE 4, has an outer wall portion 33W which is angled to conform substantially to the curvature of the spool wall 36 so as to lie flush therewith when the finger is retracted, as in FIGURE 3. At a point slightly inward of said angled block face is an angled tape-receiving slot 37 (FIGURE 5, also) pitched substantially at the same angle as said angled face and into which an end portion of the tape web is fitted when the tape is anchored to the reels. The actual end 38 of the tape will be secured by any suitable means such as the post 39 in the hub cavity, whence it extends through a slot 40 to the outside of the spool wall to make approximately a half-turn about the latter, bringing the web portion W to the trigger slot 37, as will appear from FIGURE 4. If the tape web now continues on about the spool, as in FIGURE 3, the coil will force the trigger finger to its inward limit with the angled face 33W thereof flush with the spool wall 36 so that the winding of tape is smoothly round at the start of the winding and the end 30E of the finger is fully retracted and lies flush with the peripheral margin of the reel rim, as in FIGURE 3.

The angular placement of the trigger finger with respect to the reel hub, axis of rotation, and angle of payout of the tape web (see reel 22A, FIGURE 1) is such that as that one of the reels which is serving at a given time as the payout reel approaches the end of the tape thereon, the outgoing web exerts a pull on the trigger finger at an angle sufficient to move it from the retracted position of FIGURE 3 to the tripping or reversing position of FIGURE 4 where it will actuate certain reversing controls to be described, it being evident that reverse or take-up rotation of the reel last referred to will likewise reverse the forces acting on the extended trigger finger and cause the tape, in winding back onto the spool, to force the finger inwardly to the fully retracted condition of FIGURE 3, and as seen in the reel 22B, FIGURE 2.

Any suitable type of reversible motor 50 (FIGURE 1) may be used for the capstan drive, the usual motor being an alternating current type with connections to reverse-drive windings 51, 52 selectively connected to the power terminals 55 by some form of switching means or relay. In the embodiment shown in FIGURE 2, and schematically in FIGURE 1, a mechanically-actuated switching means is employed and actuated by the trigger fingers of the two reels, it being one of the advantages of the disclosed improvements that such an arrangement eliminates the customary use of relays and the appurtenant wiring usually found in such devices.

The form of switching means shown in FIGURE 2 comprises a long rocker lever 44 pivotally mounted on the deck at 45 and having a rounded bearing formation 46 at each of its ends, said formations respectively fitting into slots 47 formed in reciprocally-movable slides 48A, 48B each having a trip finger 49A, 49B at its end adjacent a corresponding reel, the finger end of each slide being of reduced size to project through one of the openings or windows 25 or 27 at the corresponding end of the cartridge case 10, so that the corresponding trip fingers lie close to the floor of the cartridge and the periphery of the reel rim in position to be struck by the end portions 30E of the corresponding trigger fingers 30A or 30B when the latter is moved out by the tape, as aforesaid, the rotation of the corresponding reel being effective to shift the slide outwardly or rearwardly and move the rocker lever 44, such operations being effected in identical manner by either reel as the end of the tape web is approached in payout rotation.

Said trigger slides 48A, 48B may actuate any suitable switching mechanism, which in the embodiment of FIGURE 2 comprises two pairs of switch blades 41A and 41B at one side of the pivotal axis at 45 and 42A and 42B at the other side thereof, the respective contact portions of said blades riding on the lever, which is formed of an insulating material and has affixed (FIGURE 2–A) therein respective alignment with each corresponding pair of switch blades, bridging contact elements 43A and 43B, so positioned that in each of the oppositely rocked reversing positions of said lever the switch blades of the corresponding pair of switches will be bridged or interconnected to close the directionally appropriate energizing circuit to one of the motor windings or terminals and cause that reverse drive which will at once reverse the capstan drive and hence the reel which caused the switch operation, whereby to start the tape in the opposite direction. Such reversal occurs very rapidly without danger of reaching the anchored end of the tape web before the reverse travel begins, so that a single turn of tape, and less, can be threaded through the trigger finger slot 37 without danger of breakage or damage by pulling the tape to the bitter end.

Figure 1:
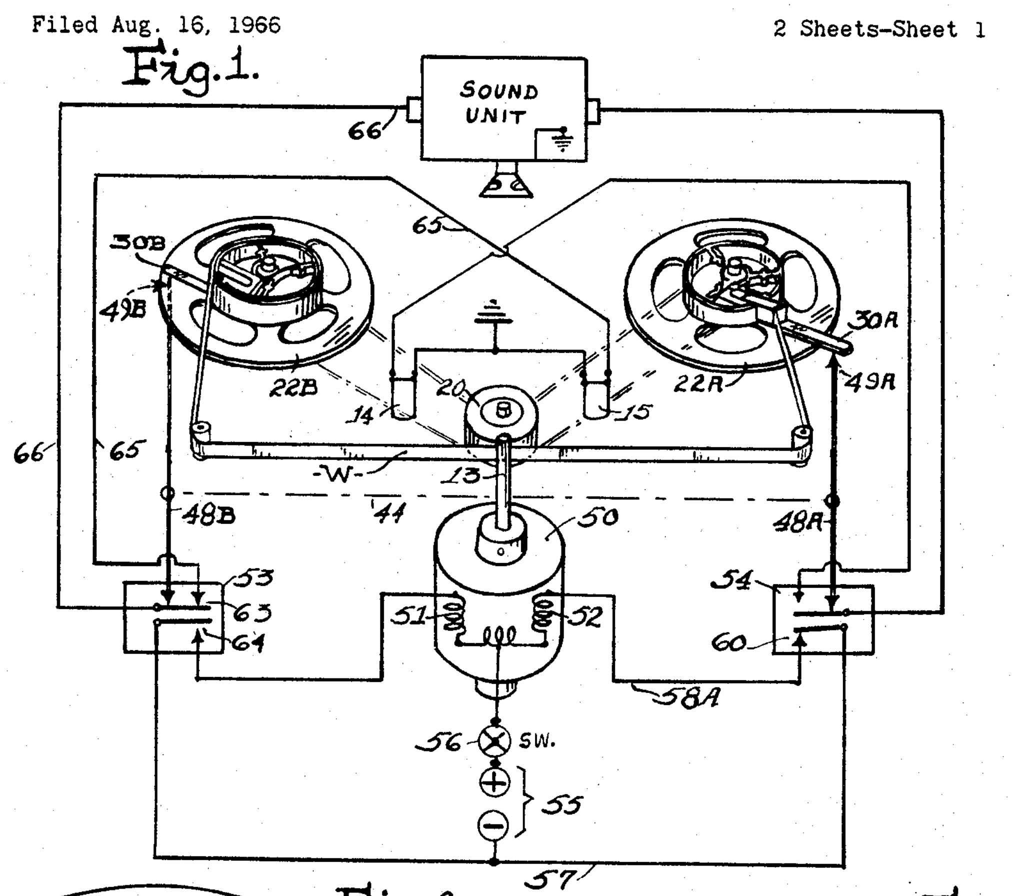
FIGURE 1 is a circuit diagram and schematic of the control means and system.

The foregoing reversing operations are illustrated schematically in FIGURE 1 wherein simple encased snap-action switches 53 and 54 are employed for actuation alternately in the manner above described, it being understood that the operation depicted in this figure is functionally identical to that described in view of FIGURE 2 except for the form of the switches employed.

Referring to FIGURE 1, the capstan motor 50 will be energized from a suitable power source indicated schematically by terminals 55, responsive to closure of on-off master switch contacts 56 connecting power via conductors 57, 58A to that one of the reversing control switches 53 or 54 whose motor contacts 60, in the example illustrated, are closed responsive to action of the trigger means 30A, thereby connecting power to motor winding 52, the resulting direction of rotation of the capstan motor being such as will now cause the tape to be reeled in by the right-hand reel 22A.

At this time the companion control switch 53 will be in condition with its sound-head contacts 63 closed to complete an operating circuit via conductors 65, 66 connecting the appropriate sound head 15 the sound unit to transduce the appropriate sound track on the tape, there being at least two such tracks contemplated for the illustrative arrangement, each of which is transduced by one of the heads 14 of 15 depending upon the direction of travel of the tape.

Under these conditions, the left-hand reel in FIGURE 1 now would be paying out the tape and the right-hand reel winding it in, the trigger finger 30A during this action being retracted by the wind-on action of the tape as previously explained.

When the tape on the payout reel 22B approaches the end of its wound length, its trigger finger 30B will be projected to rock the actuator bar 44 and throw the actuating slide and trip finger means 48B to operate the corresponding control switch means 53 (this switch means in FIGURE 2 being shown as a slide switch 41A–43A, etc.), thus opening sound-head contacts 63 and closing motor contacts 64 to reverse the reel travel, this operation of rocker 44 also causing operation of the companion control switch means 54 to open motor contacts 60 prior to closure of motor contacts 64 as aforesaid.

A modified form of the reel trip-out and reversing control is shown in FIGURE 6 wherein the general reel construction is similar to that previously described in that the reel includes a hub portion 70 surrounded by a hub cavity 71 defined by an annular spool wall 72 upstanding from a single bottom flange 73, there being a tape anchoring stud 74 situated in the hub well opposite a tape slot 75 through which the end of the tape web is introduced for engagement with the anchoring means or stud 74.

At a point spaced around the spool wall from the anchoring zone is a small inwardly recessed cavity 76 which communicates at its bottom with a radial slot 77 in the reel flange extending outwardly nearly to the periphery of this flange.

A trigger finger or lever 78 fitting easily into this slot has an enlarged inwardly located block or offset 79 which fits freely into the open upper end of the spool recess and is rockably seated therein in such manner that the long trigger finger portion 78A can move up and down relative to the reel flange to dispose said finger in and below the slot 77, as illustrated in FIGURES 7 and 8, which also depict one form of construction for rockably seating the trigger in recess.

Referring to FIGURE 10, the trigger block portion 79 is provided with a slight taper 79T at its opposite vertical sides, giving it a wedge-shape narrowing slightly inwardly toward the spindle axis; and the corresponding margins 79M in the passage through the spool wall into said recess are similarly conformed with the result that the block is captured in the recess but with side clearance sufficient to permit its rocking outwardly into the limited position shown in FIGURES 6 or 8 where it is stopped owing to the aforesaid wedge shape, such rocking motion resulting from the provision of a fulcrum or pivot seat 81 formed at the inner end of the radial slot 77 with a complementary notching 83 at the foot of the trigger block and an adjoining rounded surface portion 84 thereof which permits free rocking motion between the raised and lowered or neutral and tripping positions of the trigger finger respectively depicted in FIGURES 7 and 8.

The operation of the aforesaid modified construction of FIGURE 6 is similar to that previously described in that the tape web W′ in approaching the end of its payout run, FIGURE 6, and because of the angle of web moving away from the spool as the trigger block 79 turns away from the last overlapping turn of the web to disengage said block, the latter is freed for rocking movement to drop the trigger finger 78 into the reversing position shown in FIGURES 6 and 8 in which it can strike a switch-actuating trip lever or finger analogous to the trip fingers 49A, 49B of FIGURES 1 and 2, with the same reversing results heretofore described for the operations explained in view of FIGURES 1 to 4, with the difference that in the case of the embodiment of FIGURE 6 the end portion 49AX of the trip slide or finger 49A, or like switch-controlling instrumentality, will be disposed beneath the reel flange 73 (FIGURES 7 and 8).

The construction of FIGURE 6 depends mainly on the mass of the block and finger and gravitational and centrifugal forces to drop the trigger when freed from the hold-in action of the tape, but if desired the modification of FIGURE 9 may be employed, wherein a light blade spring 90 may have its foot seated in a slot 91 at the bottom of cavity 76 with its upper end biased against the trigger block 79 to urge the latter additionally to trigger position. Optionally, a boss 82 may also limit block 79.

Moreover, the reversing control adds greatly to the versatility and success of the reel-to-reel type of tape feed when embodied in a cartridge since a mechanical switch-actuating structure eliminates the need for an electrically conductive tag on the tape and other control expediencies such as special reversing sound signals on the sound track and selective circuit means for utilizing same, as heretofore employed for such purposes and whereas control triggers have been employed heretofore in connection with winding and spooling reels, it is believed a new combination to employ reversing circuit means controlled thereby in conjunction with sound tape cartridges and the like in which a relatively stationary control member is caused to enter the cartridge for cooperation with the reel trigger as a result of placement of the cartridge in operating position relative to a capstan or sound head.

So far as known, the state of the art prior to the present disclosure is exemplified by the references cited and the relatively complex reel trigger mechanisms found in U.S. Patent No. 2,622,812, wherein a reel spindle is shifted axially to actuate a switch means in connection with a wire recording apparatus, any construction according to these teachings being obviously involved and costly and wholly unsuited to installation in a compact cartridge. The presently disclosed construction can be completely included within the body margins of the tape spool and thus adapted to use in any flat cartridge capable of containing the spool.

A form of rocking control trigger is found in U.S. Patent No. 2,486,473 for actuating reverse gear means for typewriter ribbons and the like. Such a trigger mechanism is not contained within the marginal limits of the reel and is not capable of the most compact construction needed for installation in a compact sound tape cartridge.

I claim:

1. In a sound tape reel, a hub structure about which the tape is wound, said structure including a bottom flange at one axial end thereof; a control triger and means movably supporting the same on the reel with a first portion contiguous to the peripheral surface of a part of said hub structure, and a second portion extensive in a direction approximately radially outwardly of the rotative axis of the hub structure along the flange, said trigger being movable in linear displacement from an inactive position in which the second portion thereof lies within predetermined margins of the flange to a triggering position in which it projects beyond said margins for engagement with a controlled instrumentality located for cooperation therewith; and means part of said first portion of the trigger interfitting wtih terminal portions of the tape web in a positive engagement therewith adjacent the end thereof which is wound upon said hub structure such that when the tape in unwinding reaches said terminal portions the said first portion of the trigger is thereby positively urged and moved by the tape to position said second portion thereof to said triggering position, reverse motion of the tape in winding back onto said hub structure effecting correspondingly reverse action of the first and second trigger portions to restore the same to said normal position.

2. A reel structure according to claim 1 wherein said hub structure includes an annular wall upon which the tape is wound; means affording a cavity inwardy of said wall in which said first portion of the trigger is received for movement to and from normal position as aforesaid.

3. The reel structure of claim 1 wherein said flange is provided with a recessed formation affording a cavity in which said second portion of the trigger is received for movement to and from triggering position as aforesaid.

4. A reel structure according to claim 1 wherein said hub structure includes an annular wall portion upon which the tape is wound; means defining a cavity with portions lying inwardly of said wall and communicating through said wall, said cavity receiving said first portion of the trigger for guided movement inwardly and outwardly to and from said normal position; and the said means engaging with terminal portions of the tape web comprising a slot in said first portion of the trigger, said slot disposed to lie substantially flush with the outer periphery of said annular wall when said first part of the trigger is in said normal position; together with guide means engaged by the tape web at a point remote from said reel in the travel thereof to and from the reel and disposing the tape web at a predetermined angle of travel serving to exert an effort on said first trigger portion which acts in a direction which is eccentric in an approximately radial sense of the axis of rotation of the hub structure for the purpose of effecting said movement of the trigger from said normal position, the tape in winding back about said hub structure exerting a force upon said first trigger portion to effect restoration of the second trigger portion to normal position.

5. A reel structure according to claim 2 wherein said cavity and said first portion of the trigger have mutually cooperative formations limiting the movement of said first portion from said normal position.

6. In sound tape apparatus, in combination, a tape cartridge containing a pair of tape winding reels each having a hub portion upon which the tape web is wound responsive to reverse rotation of said reels; means including a reversible motor for driving said reels reversely; switch means connecting power to said motor and having alternate positions each corresponding to one of the driving directions of operation thereof; means providing an entrance to the cartridge adjacent each reel; control members each enterable into one of said entrances responsive to placement of said cartridge in operative relation thereto; and means assembled with each hub portion including a trigger member movable in a direction generally parallel to a radius of the hub portion under control of appertaining terminal portions of the tape web in winding and unwinding travel from and back onto the appertaining hub portion cooperable with said trigger member to move the same from a normal inactive position to a triggering position for engagement with the corresponding one of said control members to move the latter in switch-actuating action as a function of rotation of the corresponding reel when said terminal portions of the tape web are reached in unwinding reel rotation, and to move the trigger member to inactive position when the said terminal portions of the tape web are winding back onto the hub portion.

7. In a sound tape cartridge adapted to cooperate with a capstan drive means, driven by a reverse drive electric motor, a pair of tape winding reels serving in alternation as take-up and pay-out reels and means mounting said reels for rotation within the cartridge and guiding the tape web in travel from reel to reel; pulley means included in the cartridge for driving said reels from power derived from said capstan drive means; reverse motor control means including reversing switch means having circuit connections with said motor, and switch-actuating means disposed for cooperative juxtaposition with the cartridge in the operative position of the latter relative to said capstan drive means; and control trigger means comprising in each reel a trigger member movable from a normally retracted idle position wherein said member is wholly contained within the margins of the body of the reel, to a triggering position responsive to unwinding of the tape to a point near its end, wherein a part of the trigger means is moved beyond said reel margins for engagement with said switching actuating means to move the latter and actuate said switch means responsive to continued rotative movement of the reel a predetermined small distance after engagement is established between said trigger part and said switch actuating means as aforesaid, whereby to actuate the switch means to effect reversal of said motor and the direction of travel of the tape web, reverse travel of the tape in winding onto the reel following operation of the trigger means thereby as aforesaid serving to restore said trigger part to said normal retracted position.

8. In a sound tape reeling device, reverse control means comprising in combination with a tape reel having a hub structure about which the tape is wound, a trigger member movable from a withdrawn position to and from a projecting position, a portion of a terminal turn of the tape about the hub having positive interengagement with said trigger and urging the same into said withdrawn position responsive to winding action of the tape, and urging the trigger to said projecting position responsive to unwinding action of the tape during the payout of some portion of said last turn and said trigger in said projected position being adapted to engage a control instrumentality responsive to angular movement of the trigger effected by angular movement of the reel in the unwinding direction.

9. In sound tape apparatus having reversible electric motor means for moving tape from one reel to another, control means for reversing the motor comprising switch means in circuit with the motor to energize the same selectively from reverse operation, a pair of tape winding reels each having a control finger projecting from a point near the reel hub outwardly toward the rim of the reel, a length of tape to be reeled and having opposite ends each engaged in the hub portion of one of said reels and with a part on the appertaining one of said control fingers; means guiding the web of tape from each reel at an angle in a direction therefrom to apply a pulling force to the appertaining finger when the terminal portion of the tape reels outwardly from the appertaining hub in said direction whereby to move said finger from the first to a second position; and switch-operating means positioned in the path of each finger in the second position thereof and moved as a result of movement of the finger by the rotation of the reel to actuate said switch means and effect a reverse driving of the motor before the end of the web is reached.

References Cited

UNITED STATES PATENTS

| | | | |
|---|---|---|---|
| 2,676,212 | 4/1954 | Williams ---------- | 179—100.2 |
| 2,854,198 | 9/1958 | Lubkin et al. ------ | 242—55.12 |
| 3,026,057 | 3/1962 | Horimura --------- | 242—55.12 |

LEONARD D. CHRISTIAN, *Primary Examiner.*

UNITED STATES PATENT OFFICE

CERTIFICATE OF CORRECTION

Patent No. 3,411,730 November 19, 1968

Jerry O. Kelley

It is certified that error appears in the above identified patent and that said Letters Patent are hereby corrected as shown below:

Column 7, line 53, "switching actuating means" should read -- switch-actuating means --.

Signed and sealed this 10th day of March 1970.

(SEAL)

Attest:

Edward M. Fletcher, Jr.

Attesting Officer

WILLIAM E. SCHUYLER, JR.

Commissioner of Patents